Feb. 5, 1952 M. I. TAYLOR 2,584,304
MOISTURE ELIMINATOR FOR BEEHIVES
Filed Jan. 27, 1947

Inventor
MERRITT I. TAYLOR

By Elizabeth Newton Dew
Attorney

Patented Feb. 5, 1952

2,584,304

UNITED STATES PATENT OFFICE 2,584,304

MOISTURE ELIMINATOR FOR BEEHIVES

Merritt I. Taylor, Richmond, Va.

Application January 27, 1947, Serial No. 724,535

9 Claims. (Cl. 6—1)

This invention relates to the successful wintering of bee colonies and more particularly to an attachment or accessory for bee hives to remove moisture therefrom. At the present time it is customary for beekeepers to pack or insulate their hives during winter months. Such packing may consist, for example, of a large wooden case of a size ample to contain a number of hives grouped together and to leave a space between the outer walls of the hives and the inner walls of the case. This space is then filled with heat-insulating material such as ground cork.

While colonies of bees in hives packed in the manner just described, may survive the cold season, they are very likely to emerge in the spring in a weakened and emaciated condition because of dysentery, spring dwindling and loss of brood. Furthermore the packing of hives is an expensive and laborious procedure.

I have found that one cause of the deleterious effects of winter packing upon bee colonies, is the collection of moisture within the hives. During wintering within the hive, the bees form a cluster over and about the combs. Heat and water vapor are given off by the cluster as a result of the natural metabolism of the bees. The moist heated air rises and, as it comes into contact with the cold top of the hive, a portion of its moisture condenses and forms drops which eventually fall upon the combs. This moisture creates a damp unhealthy condition within the hive which, prior to my invention, could be remedied only by raising the temperature within the hive to thereby reduce the relative humidity. This damp condition is, quite obviously, aggravated by the aforesaid procedure of winter packing. As a result, colonies are unable to produce the maximum quantity of honey during the season.

Pursuant to the foregoing general aims, it is an object of my invention to provide a moisture eliminator which takes advantage of natural physical laws to remove excessive moisture from the hive as fast as it accumulates.

Another object is to provide a moisture eliminator which is inexpensive to produce, which can be quickly and easily placed in existing hives, and which will eliminate the need for packing.

A further object is to provide a moisture eliminator for bee hives which, in keeping the air within the hive at a relatively low temperature and a healthful relative humidity, assures that the energy of the colony will be conserved, dysentery, loss of brood and spring dwindling prevented.

Other objects and advantages will appear as the description proceeds.

Figure 1:
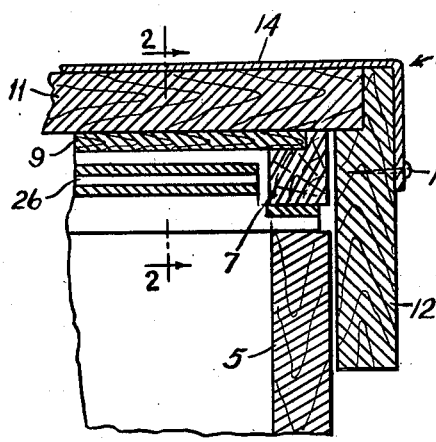
Figure 1 shows a vertical section taken on a plane indicated by line 1—1, Figure 2, and showing the upper corner of the side of a standard bee hive with the moisture eliminator in place.

Referring in detail to the drawing, the numerals 5 and 6 indicate the side and front walls, respectively, of a standard type of bee hive. This hive is provided with an inner cover having a rectangular frame formed of side and end strips 7 and 8 rabbeted along one inside corner, to receive a cover 9. This inner cover has the same external dimensions as the hive proper and may be used either in the position shown or inverted to form a dead air space between itself and the outer cover.

The outer cover 10 consists of a flat piece 11 fitting a rabbet in the inner corners of a rectangular frame formed of pairs of side and end strips such as 12 and 13. A sheet 14 of moisture proof flexible material, is secured over the top with its sides extending down over side strips 12 and 13 and secured along its edges with nails 15. The outer cover 10 fits down over and about the side walls 5 and 6 and is supported by the inner cover. The hive ends may be rabbeted as at 16, Figure 2, to provide supports for the frames.

During the winter season, the bees form a cluster over and about the frames. The bees in their natural metabolic processes, give off heat and water vapor. The warm, moistened air in and about the cluster, rises to the top of the hive and, coming in contact with the cold top, deposits moisture thereon. This moisture forms into drops on the top of the hive and unless removed will fall upon the combs and frames with the deleterious results previously mentioned.

Figure 4:
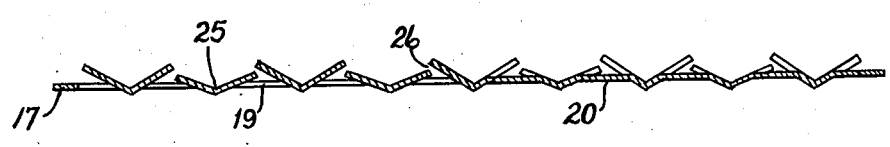
Figure 4 is a section taken upon the line 4—4, Figure 3.

To overcome this serious drawback, I have provided a moisture eliminator which may consist of a rectangular sheet of metal or plastic, stamped, or cast, to form a rectangular frame having end portions 17 and 18 and side portions 19 and 20. Slits such as 21, are formed in aligned relation along and adjacent each side edge, ten being shown in the model selected for illustrating the invention. Slits 22 and 23 are formed along and parallel to the end edges, each communicating at its ends with the ends of the adjacent pair of side slits. Slits are then formed between each pair of opposed side slots midway of said slots, as indicated at 24 and the sides or wings thus formed are pressed or bent upwardly along a central, median transverse line such as 25 to form a series of parallel troughs in side by side relation. Adjacent troughs are of different heights or overall vertical dimensions, so that their side edges may slightly overlap, as indicated at 26, Figures 2 and 4. The bends along lines 25 may extend to and across the side strips 19 and 20. In such a procedure, of course, the original length of the sheet must be greater than the final desired length, by an amount equal to the foreshortening thus produced. Since bees have a tendency to close a space or gap greater than three-sixteenths of an inch, all slots and spaces, such as 28 between the upper edges of the troughs and the under surface of the cover as well as between edges as at 26, are preferably, but not necessarily, spaced not more than the distance mentioned.

Figure 5:
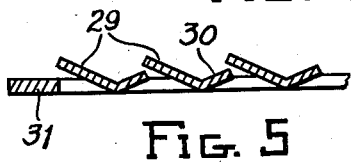
Figure 5 is a section of a modification.

In Figure 5, I have shown a modified form of the invention in which all troughs are of the same size and shape. In this form, each trough has a relatively wide side or wing 29 and a shorter wing 30. Each wide wing overlaps and is spaced from the edge of the next adjacent shorter wing, the function being the same as in the species of Figure 4. In Figure 5, the material of the rectangular frame 31 is thicker than that of the troughs, and the bottom surface of the frame lies in the plane of the nadir of the troughs. The trough ends abut the inner side edges of frame 31. These sides may have slight indentations extending transversely thereacross, each being aligned with a trough bottom, whereby condensate is positively conveyed to the outer edges of the frame. In this form, the over-all vertical dimension of the frame is the same for sides and ends.

Figure 2:
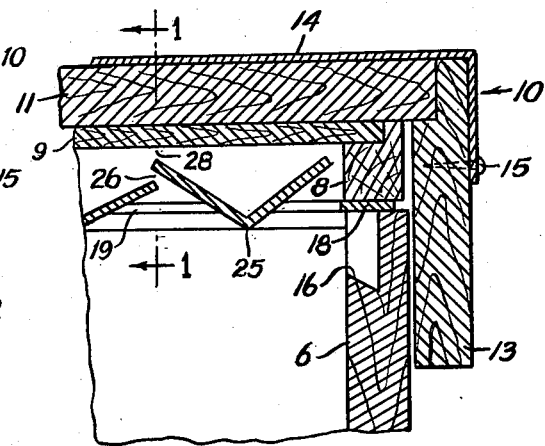
Figure 2 is a section taken upon a plane indicated by the line 2—2, Figure 1, and showing the upper front wall, outer and inner covers of a hive, with the invention in place.
Figure 3:
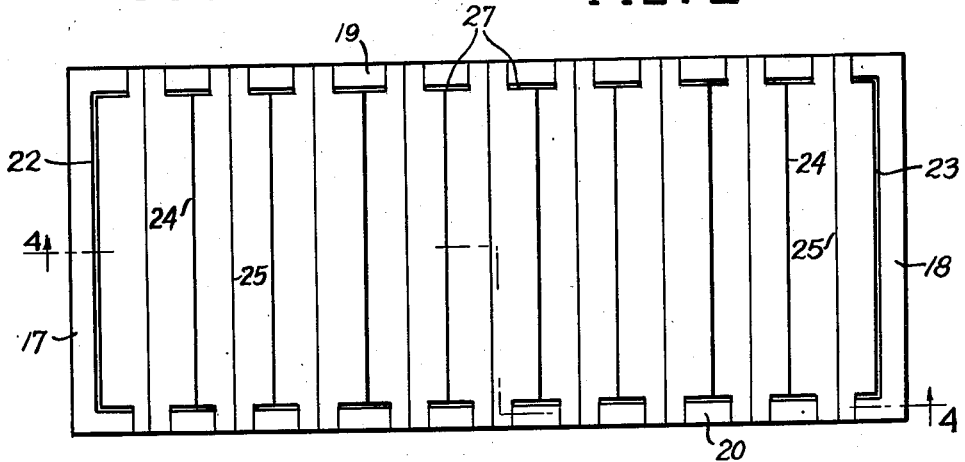
Figure 3 is a plan view of the eliminator, shown on a scale reduced from that of Figures 1 and 2.

While in Figures 1 and 2 I have shown the inner cover as being reversed from its usual position, this is not necessary. When it is desired to use inner cover 9 in its usual position, four wooden strips of the proper thickness are nailed along the edges of the top surface of the moisture eliminator. The inner cover is then used in a position inverted from that shown, with the frame of the moisture eliminator interposed between the top of the hive and the aforesaid strips. This arrangement provides a double dead air space that aids in keeping the colony cool in summer and warm in winter. With such a construction the eliminator forming my invention may be left in place throughout the year. Furthermore, in summer, one or two of the aforesaid strips may be removed to afford better ventilation for the hive and reduce the temperature inside, thus reducing the tendency of the bees to swarm during the hot weather. Alternatively, of course, the strips may be nailed or otherwise secured to the back surface of the inner cover, that is, the upper surface as shown in Figures 1 and 2. The species of Figures 3 and 4 may be formed with equal facility of plastic or metal. This is true also of the species of Figure 5 although it is particularly well adapted for a one-piece plastic construction.

I have thus provided a relatively simple and inexpensive attachment for hives that is easily placed in use and that will keep the interior of the hive in a dry, sanitary and healthful condition. The elimination of moisture within the hive enables the maintenance of a healthful relative humidity therewithin, and enables the colony to thrive at a much lower temperature than is the case where moisture is allowed to accumulate. Moldy combs and honey are prevented and a full colony emerges in the spring in a healthy and vigorous condition, ready for work. As a result, each colony produces a maximum supply of honey during the season.

While I have shown the preferred form of my invention, together with a modification, other modifications and alterations will occur to those skilled in the art, after a study of the present disclosure. For example, the troughs may extend longitudinally of the hive instead of transversely, as shown. Also, instead of letting the accumulated moisture run down between the vertical portions of the top cover and the outer wall of the hive, it may be conveyed to the exterior of the hive by pipes. With this purpose in view, the troughs may convey the moisture to troughs or channels formed longitudinally in the top surfaces of the frame. These channels may then communicate with small pipes or channels leading to the exterior of the hive. Hence the disclosure should be taken as illustrative and not in a limiting sense. It is my intention and desire to reserve all such changes as fall within the scope of the subjoined claims.

Having now fully disclosed my invention, what I claim and desire to secure by Letters Patent is:

1. The combination with a bee hive having closed side walls and a top adapted to fit about and be supported by said walls, of a moisture eliminator, comprising a frame having two sides adapted to rest on respective ones of said side walls and, in turn, to support said top, and a plurality of parallel shallow troughs having side edges and also having ends secured to said two sides of said frame, respectively, and extending therebetween, said troughs having their adjacent parallel side edges overlapping and vertically spaced by not more than three-sixteenth inch to form a trap for moisture dropping from said top, said edges being spaced by not more than three-sixteenth inch from the under surface of said top when the latter is in position on said hive at least one side of said frame being so constructed and arranged as to form a continuation of each trough, whereby moisture in said troughs is conveyed to the outside of the hive.

2. The combination with a bee hive having closed front, rear and side walls, and a top adapted to fit down over and about said side walls and to rest thereon, of a moisture eliminator comprising, a rectangular frame having side edges adapted to rest on said side walls in interposed position between said walls and top, and a series of shallow upwardly-facing parallel troughs having their ends secured to and supported by opposite side edges of said frame, said troughs having overlapping, vertically spaced adjacent edges, there being crimps formed in each said side edge, each crimp being in alignment with and forming a continuation of, the bottom of a respective trough, whereby moisture therein is conveyed exteriorly of said hive.

3. A moisture eliminator for bee hives having side walls and a removable top, said eliminator comprising a frame adapted to rest on said walls, and a plurality of parallel troughs extending across said frame between and across the sides thereof, said troughs acting to collect and convey moisture dripping from said top, to the exterior of said hive.

4. In a moisture eliminator for bee hives, a frame having parallel side edges adapted to rest upon the top edges of the opposite walls of a bee hive, a plurality of parallel shallow troughs attached at their ends to opposite side edges of said frame, alternate troughs forming a first series and being of the same height, the troughs intermediate said alternate troughs forming a second series and being of greater height than those of said first set, the edges of the troughs of said second set overlapping the contiguous edges of the troughs of said first set, whereby all moisture dropping from the roof of said hive is caught by said troughs and conveyed to the exterior of said hive.

5. An article of manufacture comprising a one piece sheet of material having opposite side edges, the material between said edges having uniformly-spaced "I" slits formed transversely in said sheet to form pairs of wings, the wings of each pair extending upwardly and outwardly to form a series of parallel, closely-spaced troughs extending transversely between side edges of said sheet.

6. In a moisture eliminator for bee hives a rectangular sheet of material having a plurality of parallel "I" slits formed therein to form pairs of adjacent wings, all said wings extending upwardly and outwardly from the plane of said sheet to form troughs extending transversely across said sheet, said slits having their tops and bottoms respectively aligned to form the sides of a frame, each said side having a crimp therein in alignment with its trough and forming a smooth unbroken continuation of its said trough, adjacent troughs having overlapping, spaced edges.

7. In a moisture eliminator for bee hives, a frame including a pair of opposite side strips, and a plurality of troughs extending between the confronting edges of said strips, each trough having a relatively wide side and a narrower side, each said wide side having its edge overlapping and vertically spaced from, the edge of the next adjacent narrower side.

8. A moisture eliminator as in claim 7, said frame being of greater thickness than said troughs, the lower surface of said frame being substantially coplanar with the nadirs of said troughs.

9. The combination with a bee hive having closed side and end walls, of a moisture eliminator for said hive adapted to rest upon and be supported by the top edges of said walls, said eliminator comprising a plurality of shallow troughs each having side edges and in closely adjacent parallel side-by-side relation, with their side edges spaced apart, each said trough extending completely across at least one said side edge to the outer surface of said wall, and means securing all said troughs in unitary relation.

MERRITT I. TAYLOR.

REFERENCES CITED

The following references are of record in the file of this patent:

UNITED STATES PATENTS

| Number | Name | Date |
|---|---|---|
| 173,788 | Hayes | Feb. 22, 1876 |
| 1,027,917 | Smith | May 28, 1912 |
| 1,055,675 | Smith | Mar. 11, 1913 |
| 1,596,776 | Stephenson | Aug. 17, 1926 |
| 1,761,095 | Spottswood | June 3, 1930 |
| 1,775,383 | Auble | Sept. 9, 1930 |
| 2,400,674 | Williams | May 21, 1946 |